(12) United States Patent
Cherny et al.

(10) Patent No.: US 11,685,593 B2
(45) Date of Patent: Jun. 27, 2023

(54) DEVICE FOR SUPPLYING LIQUID

(71) Applicant: ELECTROPHOR, INC., Woodmere, NY (US)

(72) Inventors: Alexander Alexandrovich Cherny, St. Petersburg (RU); Ivan Ivanovich Ogdanskiy, Romanovka (RU); Joseph L. Shmidt, Woodmere, NY (US)

( * ) Notice: Subject to any disclaimer, the term of this patent is extended or adjusted under 35 U.S.C. 154(b) by 62 days.

(21) Appl. No.: 17/609,569

(22) PCT Filed: Mar. 26, 2020

(86) PCT No.: PCT/RU2020/000180
§ 371 (c)(1),
(2) Date: Nov. 8, 2021

(87) PCT Pub. No.: WO2020/214063
PCT Pub. Date: Oct. 22, 2020

(65) Prior Publication Data
US 2022/0258957 A1   Aug. 18, 2022

(30) Foreign Application Priority Data

Apr. 15, 2019  (RU) .......................... RU2019111282

(51) Int. Cl.
| | | |
|---|---|---|
| *B65D 83/14* | (2006.01) | |
| *B65D 83/26* | (2006.01) | |
| *B65D 83/28* | (2006.01) | |
| *B65D 83/54* | (2006.01) | |
| *B65D 83/32* | (2006.01) | |

(52) U.S. Cl.
CPC ......... *B65D 83/754* (2013.01); *B65D 83/267* (2013.01); *B65D 83/28* (2013.01); *B65D 83/54* (2013.01); *B65D 83/32* (2013.01)

(58) Field of Classification Search
CPC .... B65D 83/754; B65D 83/267; B65D 83/28; B65D 83/54; B65D 83/32; A45F 3/16; A45F 2003/163; C02F 1/003; C02F 1/283; C02F 1/42; C02F 1/444; C02F 1/68; C02F 2201/006; C02F 2201/009; C02F 2209/008; C02F 2209/42; C02F 2307/02; B05B 9/0811; B05B 11/0094; B05B 12/122;
(Continued)

(56) References Cited

U.S. PATENT DOCUMENTS

| | | | | |
|---|---|---|---|---|
| 4,636,307 A | * | 1/1987 | Inoue .................. | B01D 63/024 96/6 |
| 4,940,542 A | * | 7/1990 | Simizu .................. | B65D 83/32 210/321.89 |

(Continued)

*Primary Examiner* — Bob Zadeh
(74) *Attorney, Agent, or Firm* — Anna Vishev

(57) ABSTRACT

The invention relates to portable liquid supply device, mainly for water from central and other sources or for suspensions, for example pharmaceutical products and nutrient liquids. The invention can be used in household, outdoors, in the garden plots, in health care institutions, for example, for patients with dysphagia, as the source of purified drinking water or nutrient liquids, which go to a patient easily. Liquid supply device, includes raw liquid vessel, pressure generating means, liquid treating unit, comprising a lid, liquid supply means, liquid treating element and raw liquid inlet element, characterized in that is configured to supply treated liquid in portions from 5 to 100 ml, with velocity 0.5 to 10 ml/sec.

36 Claims, 12 Drawing Sheets

(58) Field of Classification Search
CPC ........... B05B 15/40; A61J 7/0046; A61J 9/00; B01D 29/23; B01D 35/26
See application file for complete search history.

(56) References Cited

U.S. PATENT DOCUMENTS

| | | | | |
|---|---|---|---|---|
| 5,007,994 | A * | 4/1991 | Snee | C02F 1/283 |
| | | | | 210/243 |
| 6,136,188 | A * | 10/2000 | Rajan | B01D 35/26 |
| | | | | 210/244 |
| 7,300,569 | B2 * | 11/2007 | Petty | C02F 1/74 |
| | | | | 210/263 |
| 2004/0144727 | A1 * | 7/2004 | McCoy | C02F 1/004 |
| | | | | 210/668 |
| 2008/0087596 | A1 * | 4/2008 | Bommi | C02F 1/002 |
| | | | | 210/232 |
| 2009/0184056 | A1 * | 7/2009 | Smith | E21B 43/34 |
| | | | | 210/722 |

* cited by examiner

DEVICE FOR SUPPLYING LIQUID

The invention relates to portable liquid supply device, mainly for water from central and other sources or for suspensions, for example pharmaceutical products and nutrient liquids. The invention can be used in household, outdoors, in the garden plots, in health care institutions, for example, for patients with dysphagia, as the source of purified drinking water or nutrient liquids, which go to a patient easily.

The liquid purification and supply device of a patent RU 2131759 (applicant "Aquaphor Inc", IPC B01D27/02, C02F1/18, C02F9/00, priority date 13 Aug. 1998, published. 20.06.1999) is known from the state of the art. The device comprises a raw liquid vessel, liquid treatment unit and pressure generating unit. Liquid treatment unit comprises liquid treatment element, liquid supply device, adapter sleeve, equipped with a nozzle for purified liquid. Liquid supply device is made as a tube for raw liquid and a tube for purified liquid. Tube for raw liquid is connected to the inlet of the liquid treatment element, and tube for purified liquid is connected to the purified liquid outlet of the liquid treatment element. Raw liquid inlet of the liquid treatment element is connected to the raw liquid vessel through nozzle. Adapter sleeve for purified liquid is connected to the purified liquid tube. Pressure generation unit comprises pressure generation device, made as pneumatic pressurizer and a tube for compressed air supply. Tube for air supply is connected from one end to the pneumatic pressurizer and to the nozzle from the other. Liquid treatment element is made as filtration cartridge.

Several embodiments are given in the patent RU 2131759. In the present application only one embodiment is studied, where the bottle is used as raw liquid vessel, the nozzle is screed on its neck, as a lid, and the raw liquid tube is inserted in the bottle. One end of the tube remains opened for the raw liquid, which is in the bottle and the other end is connected to a nozzle.

The device of a patent RU 2131759 operates as follows.

The bottle is filled with liquid. The nozzle with pneumatic pressurizer connected to it through tube for pressurized air is screwed on the bottles neck. Then the filtration cartridge is screwed on the nozzle. Liquid purification tube is connected to the adapter sleeve of the nozzle. After it by pneumatic pressurizer excess air pressure through a tube for compressed air is fed inside the bottle. And raw liquid through raw liquid tube and nozzle flows into filtration cartridge, where filtration process takes place, and the purified liquid though the adapter sleeve and the tube for purified liquid goes to a consumer.

The main drawback of the device of a patent RU 2131759 is that the user gets the purified liquid not right away. To get the portion of the purified liquid the user has to apply physical effort to pump the pressure. This decreases usability of the device of a patent RU 2131759.

Liquid supply device of a U.S. Pat. No. 4,940,542 (Applicant Tomei Sangyo Kabushiki Kaisha, Mitsubishi Rayon Co., Ltd., IPC E01D 61/00, priority 27 Oct. 1989, published. 10.07.1990), is known form the state of the art and chosen as the closest analogue. Device of a U.S. Pat. No. 4,940,542 comprises raw liquid vessel with a nozzle for air supply, pressure generating means and liquid treatment unit, comprising a lid, a spout placed in a lid, liquid supply means, connected to the spout and to the liquid purification element. Liquid supply means is made as a tube. The valve dispenser is made in a lid. When valve dispenser is closed, the system is totally airproof. The spout is a L-channel connected to liquid supply means from one side and to valve dispenser from the other. Pressure generating means is connected to a vessel through the air supply nozzle, made on a side wall or in the bottom of the vessel (according to device embodiment). Pressure generating means can be made for example, as a pneumatic pressurizer or compressor. Liquid purification element is made as filtration cartridge.

Liquid supply device of a U.S. Pat. No. 4,940,542 operates as follows. The lid is screwed off from the raw liquid vessel and the tube (liquid supply means) with the filtration cartridge (liquid treatment means) is taken out of it. The vessel is filled with raw water and the lid is screwed on its neck. The air is compressed into the vessel (with pneumatic pressurizer manually or with compressor). When the pressure reaches the required value, the user manually opens valve-dispenser and due to the pressure difference the liquid flows into the liquid supply means and then through liquid treatment means and through the spout and valve-dispenser it flows to a consumer.

The device of a U.S. Pat. No. 4,940,542 has several major drawbacks: it is inconvenient in operation, as does not provide convenient liquid consumption. The user gets a portion of treated liquid indirectly, the additional vessel for treated liquid is needed to collect it. Only after it the user can get the treated liquid. Because of this drawback this device cannot be used for medical purposes. Another drawback of this liquid supply device is that liquid supply means and liquid treatment element must be taken out from the raw liquid vessel. It is inconvenient, as the user has to hold the liquid supply means and liquid treatment means and at the same time the user has to fill the vessel with raw liquid. Or the user has to find the surface where to put the liquid supply means and liquid treatment means without a risk of contamination. The indicated drawback limits the scope of use of the device.

Object of the invention and the technical result achieved when using the invention is to develop new liquid supply device intended for individual use and comfortable consumption of purified liquid in natural portions—in sips.

Problem to be solved and technical result to be achieved by that the liquid supply device, comprising raw liquid vessel, pressure generating device, liquid purification unit, comprising a lid, liquid supply means, liquid purification element and raw liquid inlet element, characterized in that is configured to supply treated liquid in portions from 1 to 600 ml, preferably from 5 to 100 ml, with velocity from 0.1 to 200 ml/seconds, and comprising connected to pressure generating means control panel, comprising, at least one sensor, at least one power component, controller, and pressure release means, and liquid treatment unit retains air-tightness when raw liquid vessel is opened, and liquid treatment unit liquid supply means is made as flexible tube. Raw liquid inlet element is placed in lower part of the liquid treatment element or in lower part of the liquid supply means and is made as the aperture or as nozzle and is equipped with the temporary retention means, which is made as a magnet and its counterpart, placed in the lower part of the raw liquid vessel or as mechanical fixation means and its counterpart, placed in lower part of the raw liquid vessel, the temporary retention means additionally comprise liquid level sensor, connected to control panel. Also, liquid treatment unit additionally comprises a spout, which can be made as separate element fastened to the lid and connected to liquid supply means, or which can be made as the detail integral with liquid supply means. Sensor of the control panel is made as a switch placed on a lid or on an outer surface of the raw liquid vessel, and sensor of the switch position, or as a volumetric sensor or sensor responding to spout displacement and/or deformation, as mechanical button, or as mechanical valve or electromechanical valve. The spout can be made as a tube, equipped with rotary joint, or spout can be made as tube, made of elastically deformable material, or spout can be made as a tube made with corrugated part to change form of the tube, and the spout may be additionally equipped with interchangeable head. Also, liquid supply device additionally comprises flap or movable cover, protecting spout, which additionally may be equipped with the element, connected to the control panel, and disable sensors. Raw liquid vessel may be made as integral detail or as two or more details. Control panel may additionally comprise wireless communication element with other devices. Liquid treatment element may be made as filtration cartridge, which may contain filtration mixture on the base of highly effective sorbents, also contain membrane with pore diameter from 0.005 to 5 microns, preferably from 0.01 to 0.1 microns, at least, part of outer surface contacts with hydrophilic material, and membrane can be made as hollow fiber membrane. Liquid treatment element can be made as a capsule, additionally equipped with a capillary to supply the additive, and contains the additive, and the additive may be, for example, mineralize agent, pharmaceutical or flavor additive. Also, liquid supply means may be made as hollow cylindrical frame, and pressure generating means can be made as micro compressor or a pump, pressure release means may be made as a valve or the aperture with the membrane inside it, and liquid treatment element comprises filtration cartridge and capsule, connected one by one.

Liquid supply device (FIG. 1) comprises a raw liquid vessel 1, liquid treatment unit 2, pressure generating device 3 and control panel 8.

Figure 1:
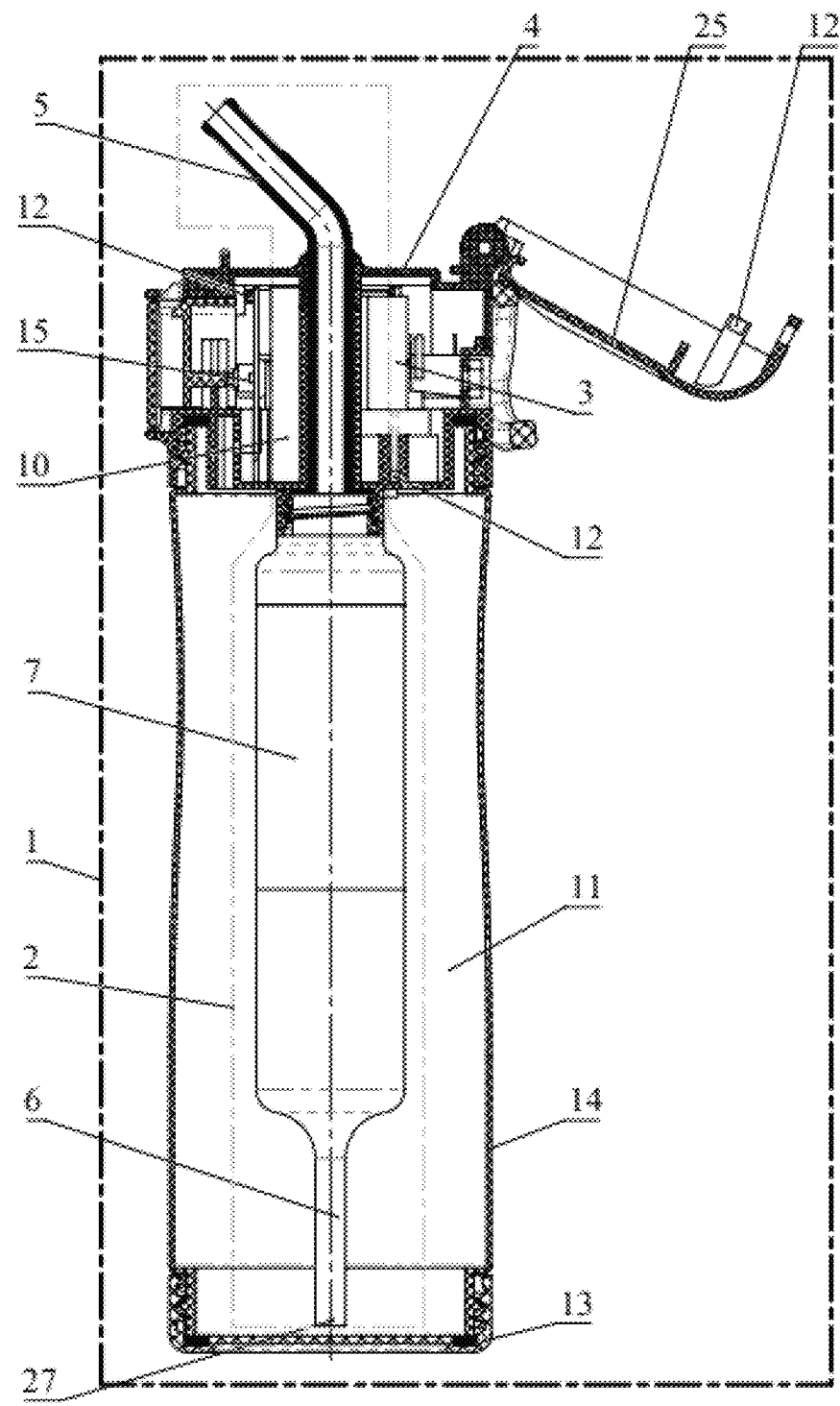
FIG. 1 shows the liquid purification device.

Raw liquid vessel 1 is made of polymeric material, for example, but not limited to PET, polyethylene, polypropylene, polyethylene terephthalate (это тоже самое, что ПЭТ), polystyrol, polyvinylchloride or polyester. Raw liquid vessel 1 may be made of glass or from organic glass of different composition, including extra strong organic glass. The vessel 1 can be made as integral detail (not given in the figures) or as two or more details, for example, but not limited to lower lid 13 and body 14. (FIG. 1).

Liquid treatment unit 2 comprises a lid 4, liquid supply means 6, liquid treating element 7 and liquid inlet element 27. Liquid treatment unit 2 additionally may comprise the spout 5.

Figure 11:
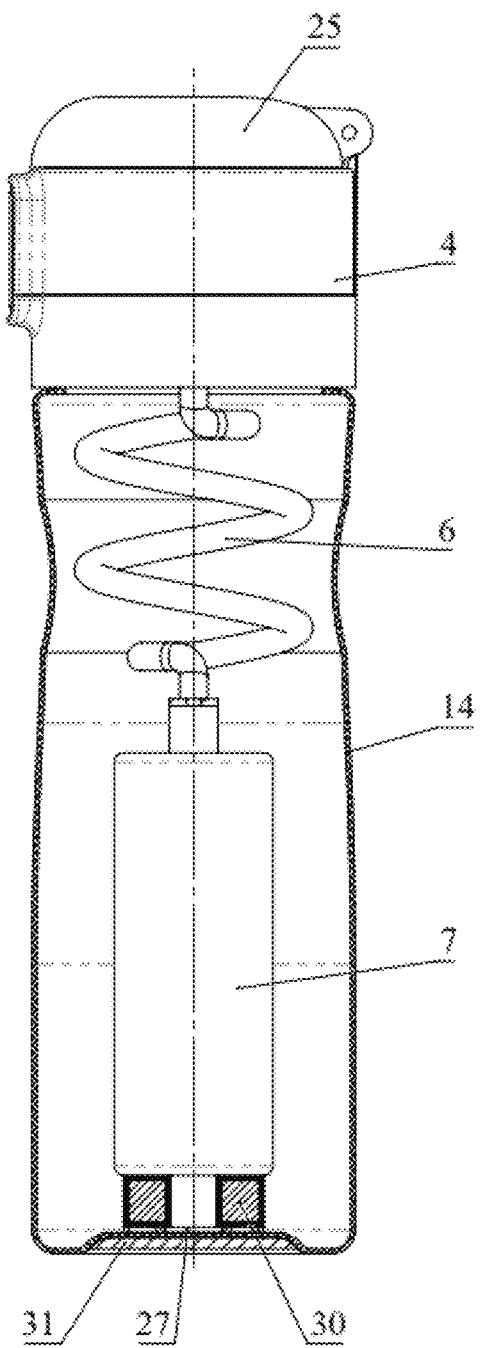
FIGS. 11 and 12 show examples of liquid supply device with liquid supply device made as flexible tube.

Liquid supply means 6 is inserted into the raw liquid vessel 1, and may be made as, for example, but not limited to, cylindrical body (FIGS. 1, 2) or flexible tube (FIG. 11, 12).

Cylindrical body may be made of polymeric materials, for example, polypropylene, polystyrol. Tube may be made of, but not limited to, silicon or PVC. Liquid supply means 6 may be made as integral part with the spout 5.

Raw liquid inlet element 27 may be made in the lower part of the liquid treatment element 7 or liquid supply means 6. Raw liquid inlet element 27 may be made as aperture (FIGS. 1, 2, 8-12), also as a nozzle (not shown on the figures). Raw liquid inlet element 27 additionally may be equipped with temporary retention means, which may be made as a magnet 30 and counterpart. Magnet either may be placed in the lower part of the liquid treating element 7 or in the lower part of the liquid supply means 6. Counterpart may be made as metal plate 31, placed on the outer side of the bottom of the vessel 1. Or temporary retention means may be made as mechanical fixation means (not shown in the figures), for example silicon supports, placed on the lower part of side walls of the liquid treatment element 7 (not shown in the figures). Temporary retention means additionally may be equipped with a sealed body (not shown on the figures), where, for example, mechanical valve and/or liquid level sensor, for example electronic with self-contained power, transferring signal of water absence to the control panel may be additionally placed (not shown on the figures).

Pressure generating means 3 may be made as compressor, micro compressor, micro pump or a pump. Also, the device is equipped with pressure relieve means 12, connected to control panel 8 and (not shown on the figures) placed, for example, but not limited to in the lid 4 or in the upper part of the vessel 1. Pressure relieve means 12 may be made, but not limited to, for example, as valve or aperture with the membrane placed inside it (not shown on the figures). Inner space 11 of the raw liquid vessel 1 is connected to pressure generation means 3 through pressure relief means 12.

Figure 3:
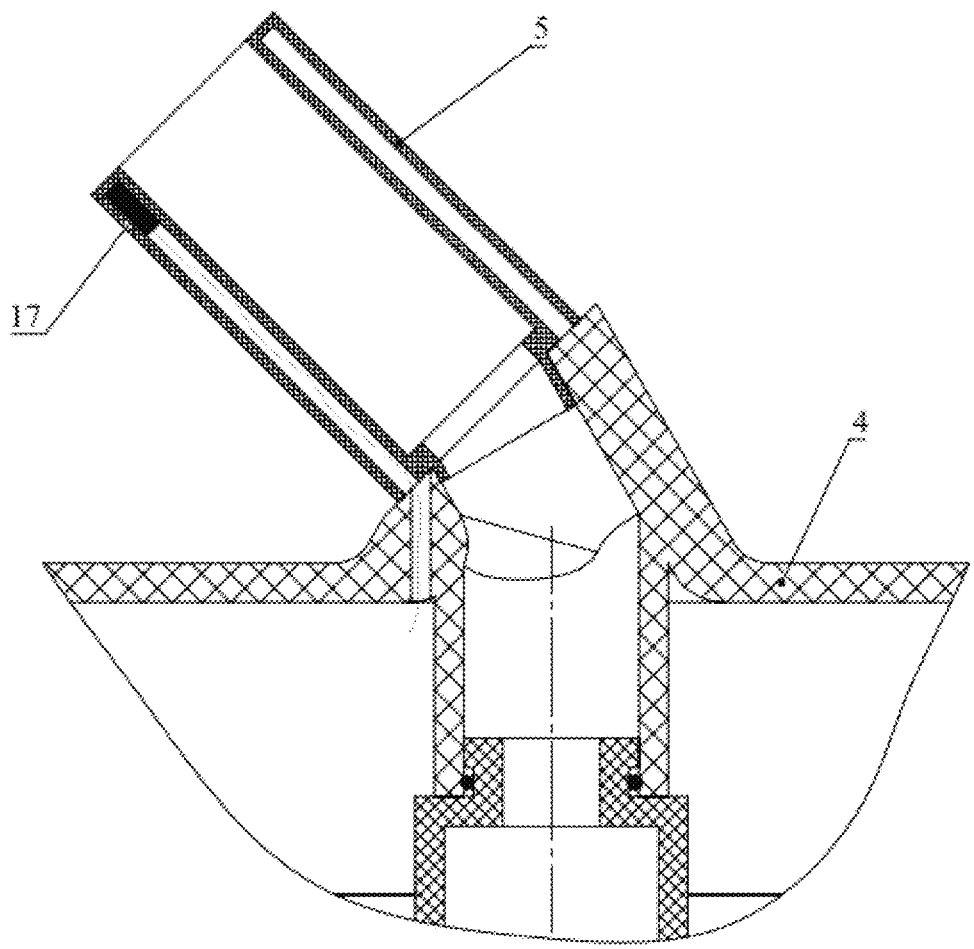
FIG. 3 shows an example of the spout made as liquid supply tube, made of elastically deformable material, where in the upper part of the spout there is a button.
Figure 4:
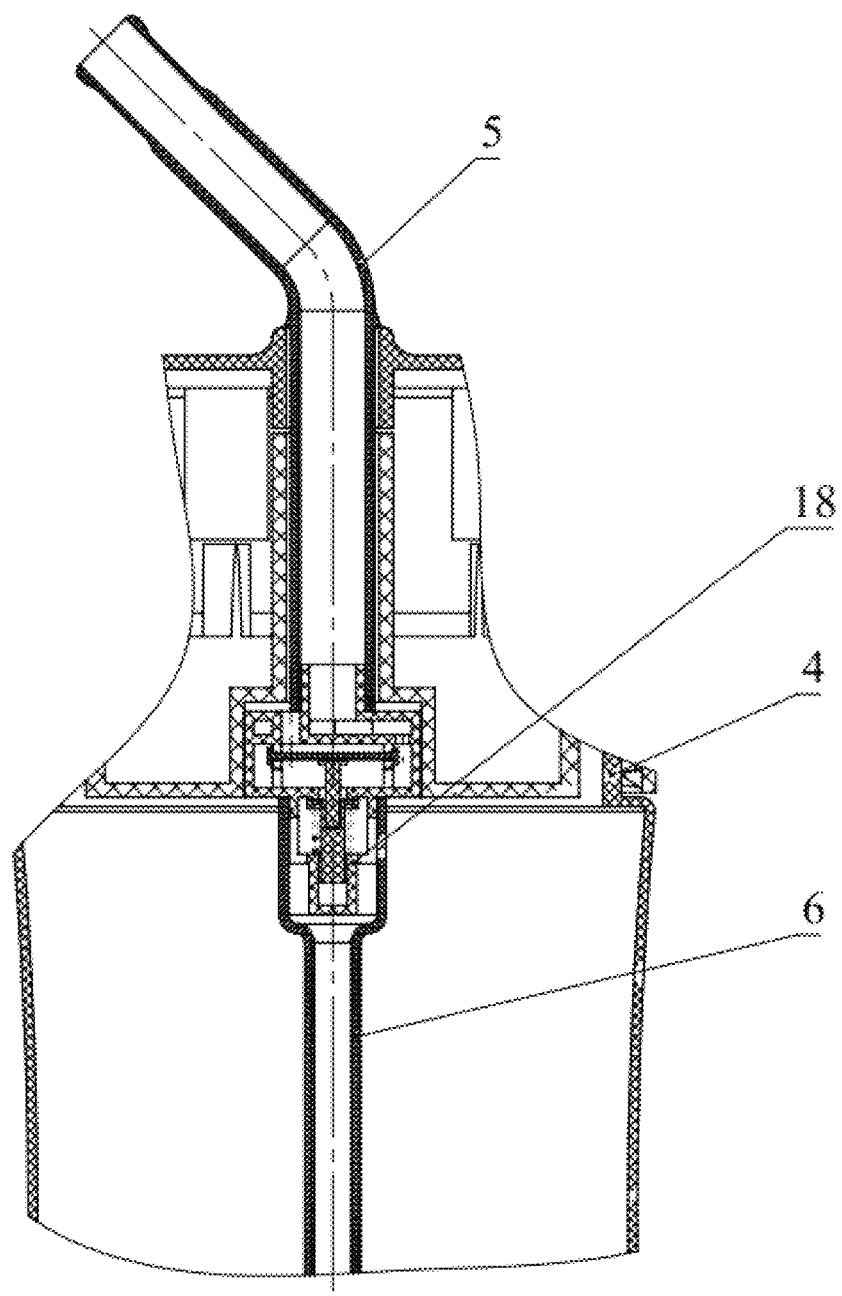
FIG. 4 shows an example of the spout made as liquid supply tube, made of elastically deformable material, where in the spout there is a detector.

Control panel 8 comprises controller 9, power component 10 and sensors. Controller 9 operatively connected to pressure generating means 3. Sensors may be made, for example, but not limited to, as a switch 15 and position sensor 16 (FIG. 2), or mechanical button 17 (FIG. 3), or detector 18 (FIG. 4), or detector 19 and magnet 20 (FIG. 5), sensor 21 (FIG. 6) or mechanical valve 22 (FIG. 7). Power component 10 may be made as battery or, preferably, as accumulator. Also, liquid supply device can work from AC network. Besides a switch 15, made as button and additionally may open the lid 4, switch on and off pressure generating means 3 and/or pressure relieve means (not shown on the figures).

Figure 2:
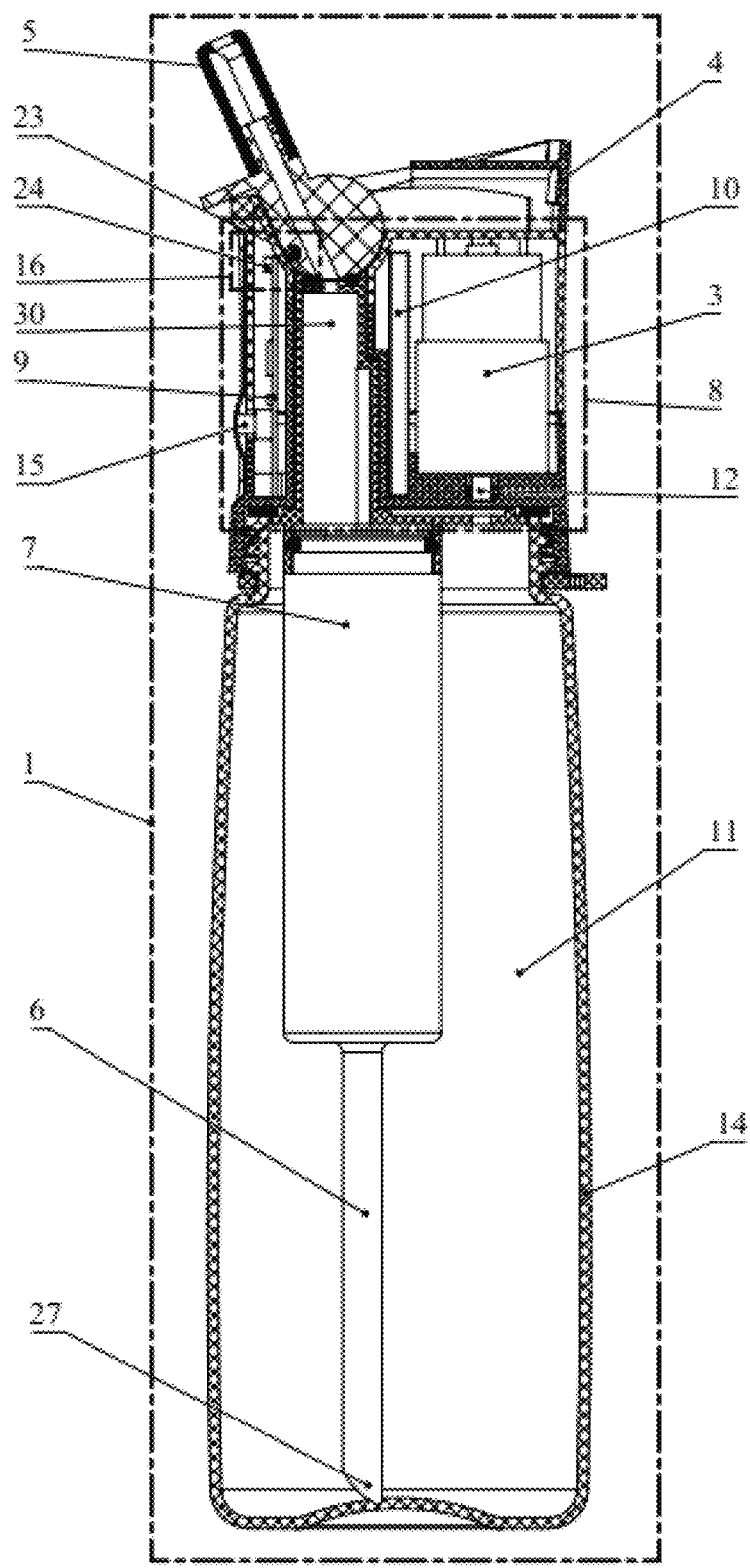
FIG. 2 shows an example of the liquid purification device, where the spout is made as rotation tube for liquid supply.

The spout 5 may be made as, for example, but not limited to as a liquid supply tube, equipped with a joint (FIG. 2), and on the wall of the lid 4 of the vessel 1 there is a switch 15, made as a button or a lever. Position detector 16 of the spout 5 is made as a magnet 23, placed on a spout 5, and magnet sensor 24, placed in the control panel 8 (FIG. 2). The liquid supply tube may be an individual element, or a part of the liquid supply means 6.

Figure 5:
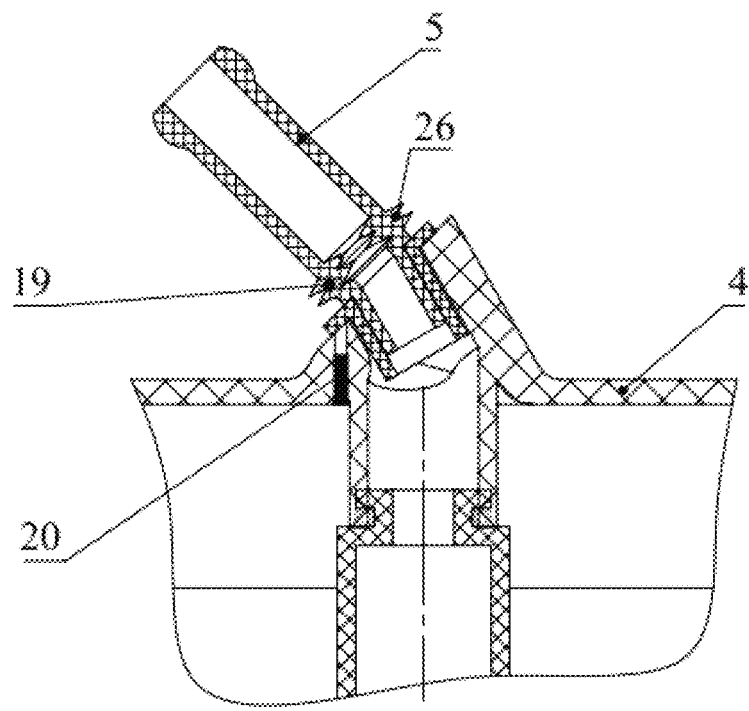
FIG. 5 shows an example of the spout made as liquid supply tube with corrugated part.
Figure 5B:
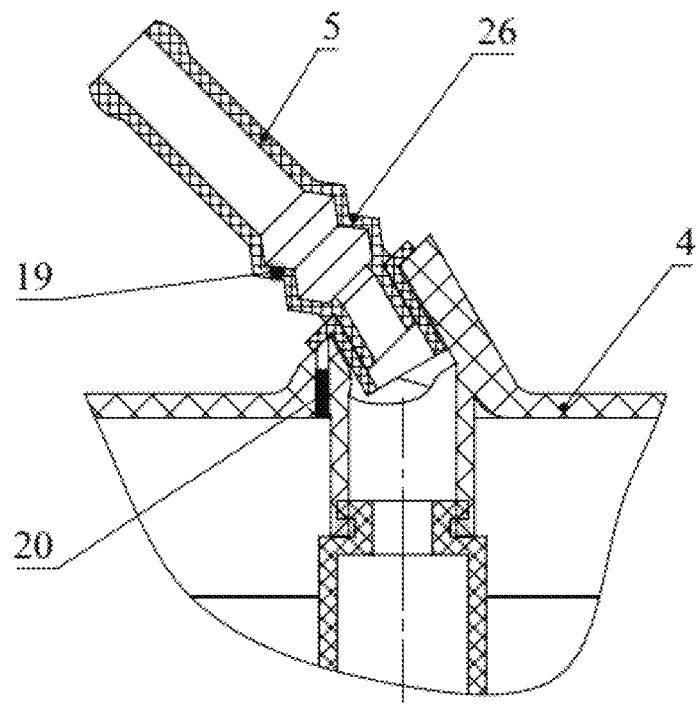
Figure 6:
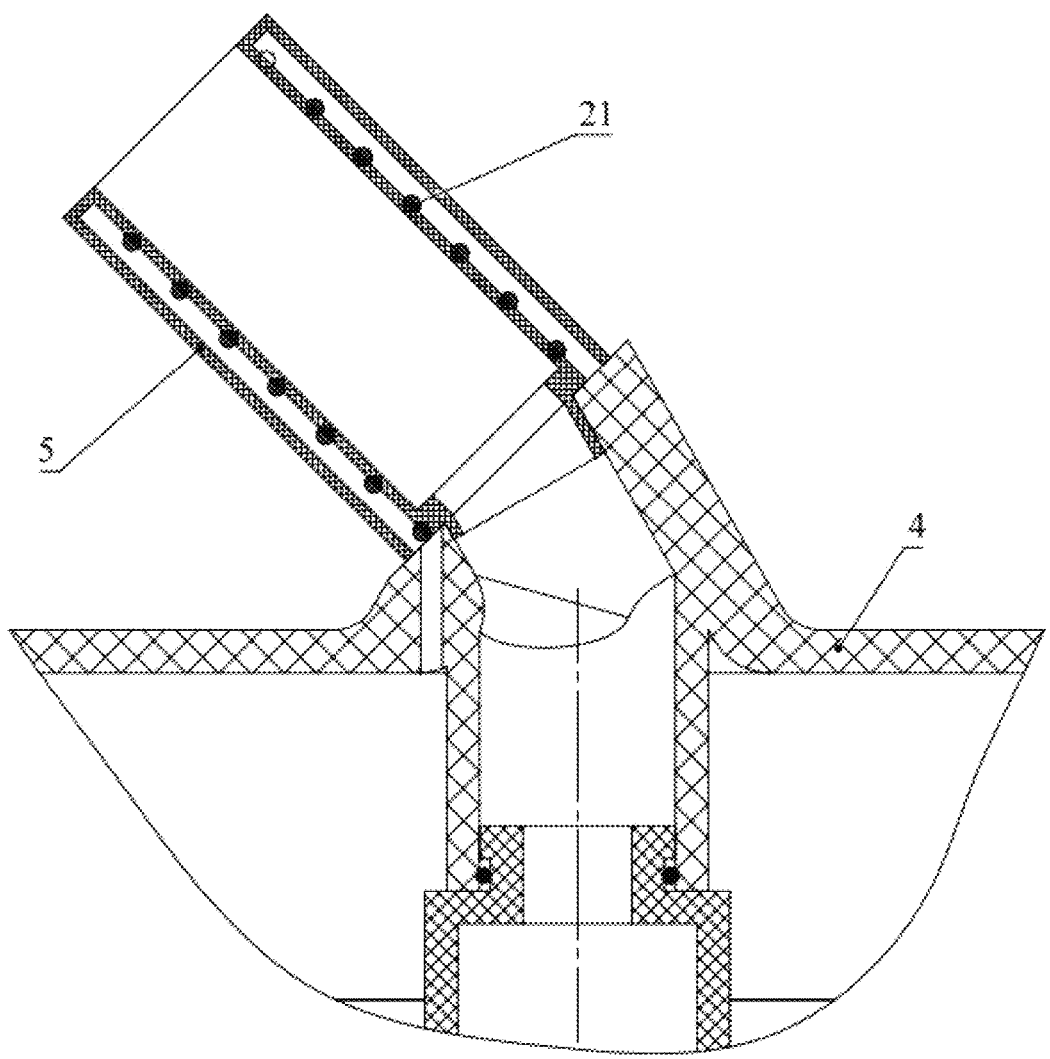
FIG. 6 shows an example of the spout made as liquid supply tube, made of elastically deformable material, where in the spout there is a sensor.
Figure 7:
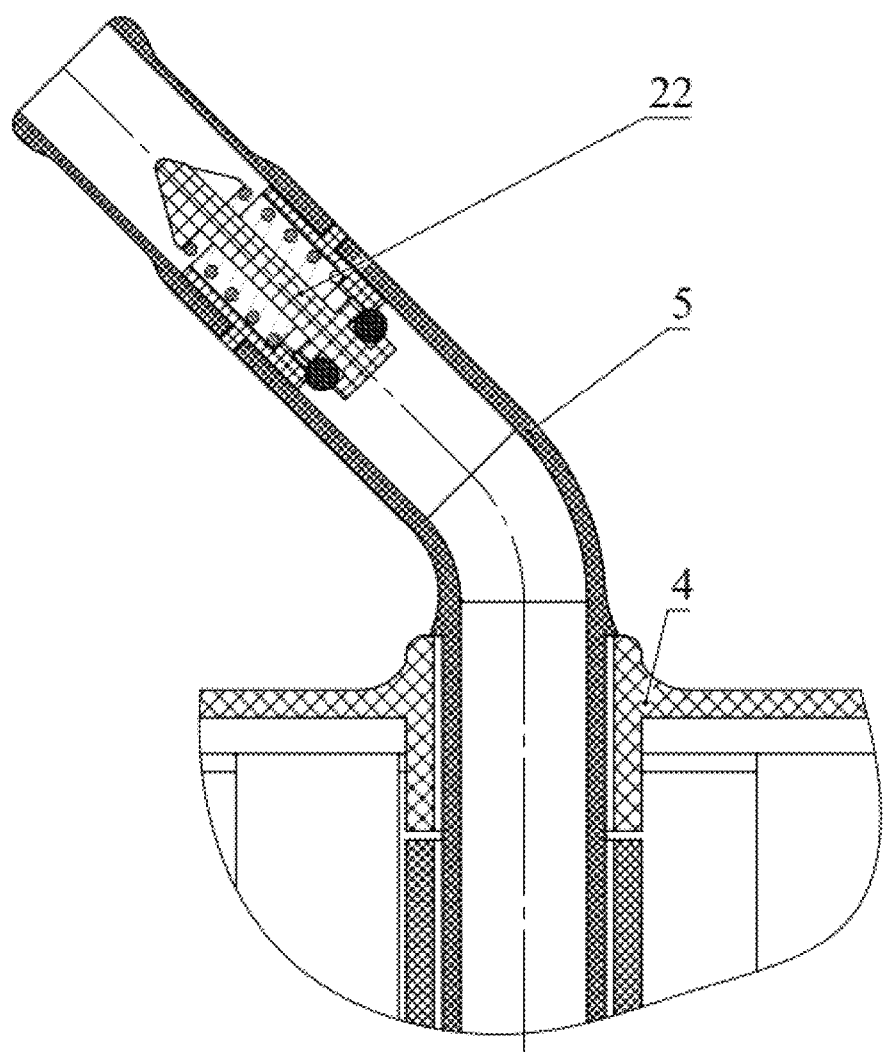
FIG. 7 shows an example of the spout made as liquid supply tube, made of elastically deformable material, where in the upper part of the spout there is a mechanical valve.

The spout 5 may be made as a tube for liquid supply, made of the elastically deformable material (FIGS. 3-7). The tube for liquid supply may be an integral element or a part of the liquid supply means 6. In this case, there is a sensor inside such a tube. This sensor can be made as mechanical button 17 (FIG. 3), contact pair or a detector (not shown in the figures). Or the sensor may be made as the volumetric detector 18 (FIG. 4), or as a sensor can be made as sensing device 21 (FIG. 6). Or the sensor may be made as mechanical valve 22 (FIG. 7). Also the lid 4 may additionally be equipped with the casing 25 (FIG. 2), which stops unapproved unlock of the sensors and prevents dirt entry into the spout 5. Also, the case may additionally be equipped with the element, connected to control panel, which disable the sensors. The indicated element may be made as a magnet 12 (FIG. 1) or detector (not shown on the figures).

The spout 5 may be made as a tube with corrugated part 26 (FIG. 5). In this case the sensor may be made as a pair—magnet 19, placed on the corrugated part of the tube and the detector 20, placed on a lid 4 (FIG. 5).

Every sensor is connected to the control panel 8 and regulates the operation of the pressure generating means 3. Every sensor may be activated manually or with the lips. The arrangement of the liquid treating element 7 and liquid supply means 6 to one another may be different.

Liquid treating element 7 may be arranged before (FIGS. 1, 2, 11), after (FIG. 12) and inside (FIG. 8) of the liquid supply means 6.

If the liquid supply means 6 is made as flexible tube, and the liquid treating element 7 is placed before liquid supply means 6, the liquid supply means can be made as integral part with the spout 5 (FIG. 11).

If the liquid treating element 7 is placed inside the flexible tube, the tube from one end is inserted in the lid 4 and its upper part is the spout 5 (the liquid supply means is made as integral part with the spout 5) (not shown on the figures).

Figure 12:
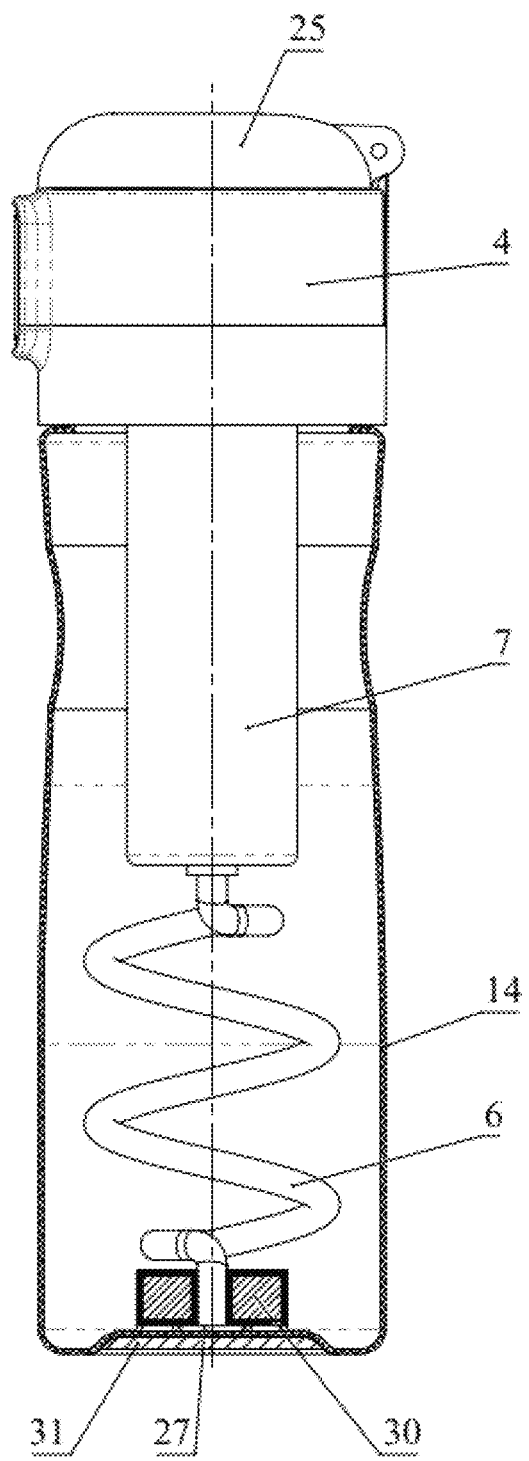

If the liquid treating element 7 is placed after the liquid supply means 6, the flexible tube from one end is connected to liquid treating element 7 and form the other end—with the bottom of the vessel 1 with the temporary retention means (FIG. 12). A net or filtration fabric to retain big particles and temporary retain means may be additionally inserted in the lower aperture of the tube (not shown on the figures).

Figure 8:
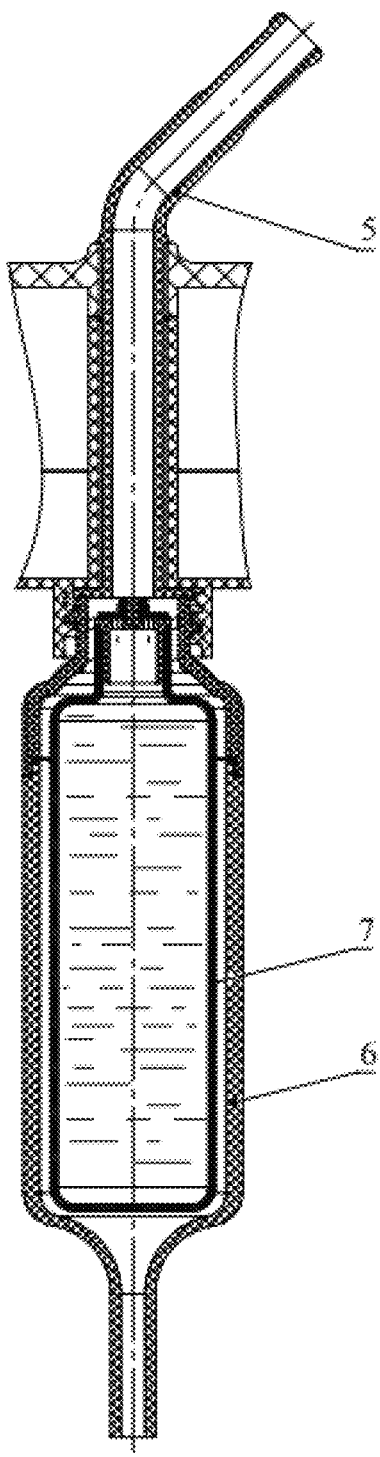
FIG. 8 shows liquid treatment element made as a capsule.

Liquid treatment element 7 may be made as a capsule, containing the additive (FIG. 8). The additive, for example, may be, mineralizing compound, pharmaceuticals or flavor additive. Given substances may be present in the capsule both as a solution and suspension. The capsule has flexible walls, which deform under liquids action, flowing up in the liquid supply means 6, or under the action of the air, compressed into the inner cavity of the vessel 1. Also, the capsule is equipped with additive outlet (not shown on the figures), made as a capillary, valve or outlet aperture, which provides dosing by portions of the additive at the moment when the portion of liquid is consumed.

Figure 9:
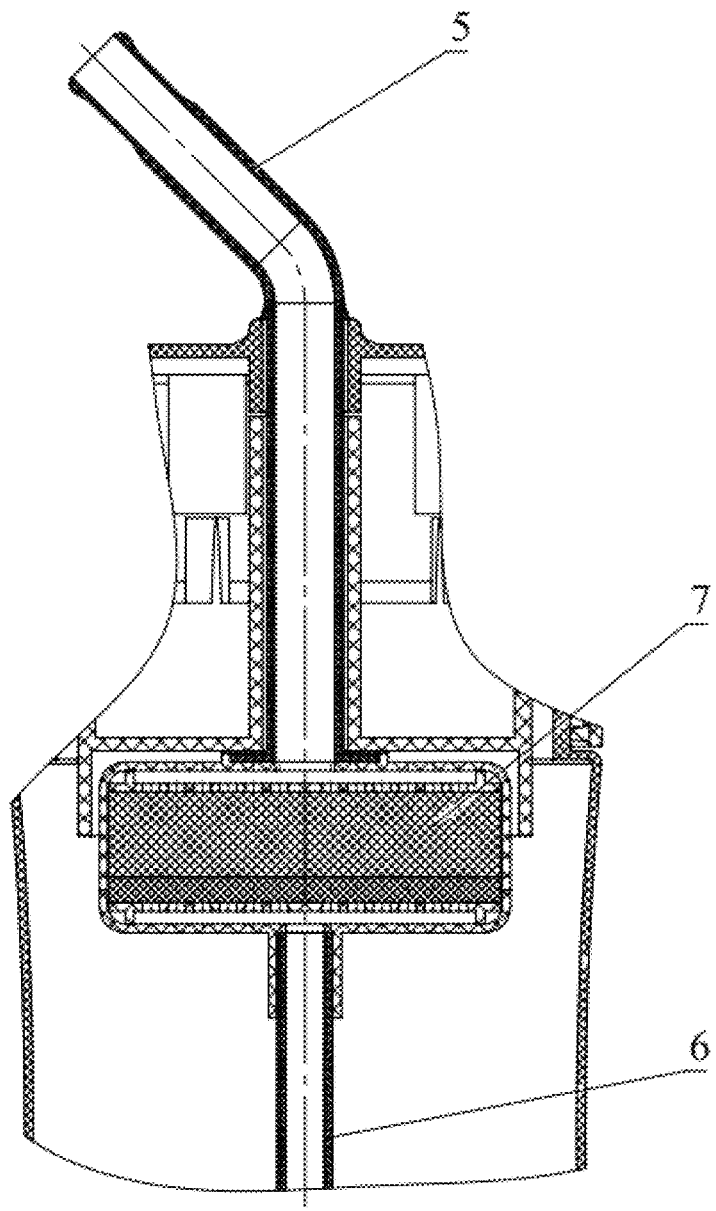
FIGS. 9 and 10 show examples of liquid treatment elements made as filtration cartridge.

Liquid treating element 7 may be made as filtration cartridge, comprising sorption mixture on the base of highly effective sorbents. Such a mixture may contain, but not limited to, such sorbents as powdered activated carbon, ion exchange resins of different dispersion ion exchange fibers, activated carbon fibers (FIG. 9).

Figure 10:
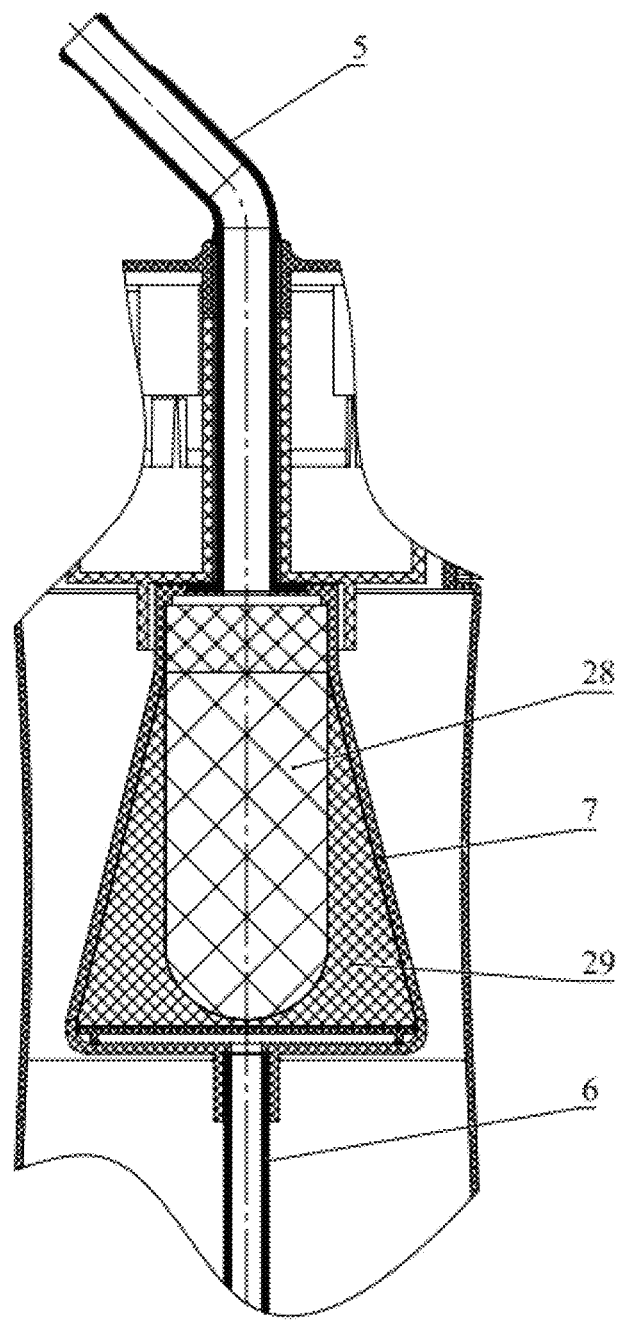

Or filtration cartridge may contain hollow fiber membrane 28 and hydrophilic material 29 and at least a part of hollow fiber membrane 28 contacts with hydrophilic material 29. Hollow fiber membrane 28 has the diameter of pores preferably from 0.001 to 0.1 mkm and thus it prevents the particles with diameter more than 0.1 mkm, and so particles with diameter from 0.4 to 20 mkm, for example, bacteria *Escherichia coli, Shigella dysenteriae*, cysts and *lamblia* to transfer into the liquid. Hydrophilic material 29 structure is formed by clusters, containing of interlaced ion exchanged fibers, the sorbent granules are dispersed between them. The clusters are connected between each other by individual fibers throughout the volume of the filtration material. Because of hydrophilic properties of material, the hollow fiber membrane 28 is wetted, even if the inner space of filtration cartridge is not totally filled with liquid. Hydrophilic material 29 acts as a wick and because of capillary effect is capable to transport the moisture and wet the hollow fiber membrane, even if the liquid reached the lower part of the hydrophilic material 29 (FIG. 10).

Besides, because of micro capillary liquid flow along outer surface of the sorbent particles, air gathered inside filtration cartridge does not block liquid to pass. Also, the vessel 1 is equipped with the additional casing or ornament made of anti-slip material to hold the device in one's hand.

Besides, liquid treating element 7 may be made as combination of filtration cartridge and capsule, containing the additive, connected one by one (not shown on the figures).

The claimed invention operates as follows. The user fills the vessel 1 with the raw liquid. After it, the user, holding the vessel 1 vertically or slightly inclined, opens the spout 5. Then the user activates pressure generating means 3 with the sensors, and liquid, passing through the liquid treatment element through the spout 5 flows to the user.

Connection between flexible tube with liquid treatment element 7 and a lid is airtight. As the tube is flexible, when the vessel 1 is filled with the liquid there is no need to take the tube with the liquid treatment element 7 out of the vessel, as the lid 4 hangs loose, touching the outer side wall of the vessel 1 (not shown on the figures). The user does not have to hold the liquid treatment element and liquid supply means or to find the surface where to put them, which increase exploitation properties of the device.

In case, if the spout 5 is made as a tube equipped with a rotary joint, the position sensor 16 of the spout reacts on change of the spouts 5 position. For example, when magnet 23, placed on a spout 5, is beyond the reach of the magnet sensor 24, the controller 9 gets the signal to switch off the lock of the liquid generation means 3. The user pushes the switch 15 of the pressure generating means 3. Compressed air from pressure generating means 3 goes into the inner cavity 11 of the vessel 1, increasing pressure above the raw liquid. Liquid rises up along the liquid supply means 6 and through channel 30 flows through a spout 5 to a consumer. So, until the switch 15 is activated, pressure generation means 15 won't supply compressed air into the inner cavity 11 of the vessel 1 and the liquid won't flow to the user through the open spout 5 (FIG. 2).

If the spout 5 is made as a tube, made of elastically deformable material, until any of the sensor is not activated, purified liquid won't flow to a consumer. For example, there is a mechanical button 17, or the detector or the contact pair inside the wall of the spout 5. To activate the purified liquid supply, and so the pressure generation means 3, the user has to take into the mouth the upper part of the spout 5, to bite it, thus activating the mechanical button 17, the detector or the contact pair. As soon as mechanical button 17 is pushed, the signal goes into the control panel 8, which activates pressure generating means 3. Compressed air form the pressure generating means 3 goes into the inner cavity 11 of the vessel 1, increasing pressure above raw liquid. Liquid rises along the liquid supply means 10 and through the channel 33 goes onto the spout 5 to the user.

If in the spout 5, made as a tube of elastically deformable material there is the volumetric detector 18, the user has to take the upper part of the spout 5 into the mouth and strongly suck in his breath. The vacuum created inside the tube unlocks the volumetric detector 18, the signal will go to the control panel 8 to activate pressure generating means 3. Compressed air from pressure generating means 3 goes into the inner cavity 11 of the vessel 1, increasing pressure above the raw liquid. Liquid rises along the liquid supply means 10 and through the channel 33 goes onto the spout 5 to the user.

If in the spout 5, made as a tube of elastically deformable material there is the sensing device 22, the user has to take the upper part of the spout 5 into the mouth to unblock the purified liquid supply. As soon as the user touches the flexible tube with his lips, the signal that the pressure generating means 3 is activated, will go into the control panel. Compressed air from pressure generating means 3 goes into the inner cavity 11 of the vessel 1, increasing pressure above the raw liquid. Liquid rises along the liquid supply means 10 and through the channel 33 goes onto the spout 5 to the user.

If inside the tube of elastically deformable material there is a mechanical valve 23, the pressure generating means 3 is activated by the button 15 or when the protection casing is opened 25 (FIGS. 3-7), but the liquid will not flow to the user until the mechanical valve is opened. If the button 15 was pressed, the pressure generation means 3 was activated, but the mechanical valve 23 was not opened, the pressure in the device released after the given period.

Pressure generating means 3 operates only when the user drinks treated liquid from the device. At all other times pressure generating means does not work. Or moment when the user does not need more purified liquid with the help of one of the sensors, he turns off the pressure generating means 3. The pressure relief valve, placed in a lid 4, activates, and the pressure drops to atmospheric. So, excessive pressure inside the vessel 1 for raw liquid supply is maintained only when the liquid is supplied to the user. In the rest of the time liquid supply device is under ambient pressure. As pressure generation means 3 may be made as compressor, pressure above liquid surface will increase gradually and furnishes smooth increase of treated liquid supply velocity. So, liquid is supplied to the user with velocity from 0.1 to 200 ml/sec, preferably from 0.5 to 10 ml/sec.

So, the claimed device safely supplies to the user treated liquid by portions in volume equivalent to volume of one or several gulps.

Liquid treating element 7 is protected from air penetration inside it. It is possible because the bottom of the vessel 1 is made as a lid 14. User fills the vessel 1 with the raw liquid, when the vessel is upside down. When the vessel 1 is returned into the home position, air, which is present inside the vessel 1, rises and raw liquid flows down. So, the liquid supply means 9 is submerged into the liquid till it is supplied. When the liquid is taken in air does not penetrate neither into the tube nor in the liquid treating element 7.

Claimed device maybe used not only to get purified liquid, but also for substance use. As there is a wireless communication element, for example Wi-Fi or Bluetooth element, in the control panel, the device maybe connected with the cellphone with the pill reminder.

In comparison with devices, described in analogues, in the claimed invention the pressure generating means creates set out excessive pressure, and sensors placed in the control panel provide treated liquid supply by portions with demanded hydraulic drop and velocity in given time—time of one or several gulps. Besides liquid treating element is protected from penetrating air, and hydrophilic compound provides uniform wetting of the filtration cartridge. Due to sensors placed in device, there is np danger during gulping of the treated liquid, flowing out of the spout, because the volume of the treated liquid is from 1 to 600 ml, preferably from 5 to 100 ml, with velocity from 0.1 to 200 ml/sec, preferably from 0.5 to 10 ml/s, which makes the device safe for children, patients with dysphagia and bed patients. So, the claimed device has wide range of applications, including medical institutions.

The description of the present invention submits a preferred embodiment of the invention. It can be changed within the claimed set of the claims, so the wide use of the invention is possible.

The invention claimed is:

1. A liquid supply device, comprising:
    a raw liquid vessel;
    a pressure generating means;
    a control panel connected to the pressure generating means, the control panel comprising at least one sensor, the at least one sensor responding to a spout displacement and/or deformation, at least one power component, a controller, and a pressure release means;
    a liquid treatment unit, comprising a lid with a through hole for insertion of the spout, a liquid supply means in fluid communication with the liquid treatment unit and the spout upon activation of the at least one sensor, a liquid treating element and a raw liquid inlet element, wherein the liquid supply device is configured to supply treated liquid in portions from 5 to 100 ml, with velocity from 0.5 to 10 ml/sec.

2. Liquid supply device according to claim 1, characterized in that the liquid treatment unit retains an airtightness when the raw liquid vessel is opened.

3. Liquid supply device according to claim 1, characterized in that in the liquid treatment unit, the liquid supply means is made as a flexible tube.

4. Liquid supply device according to claim 1, characterized in that the raw liquid inlet element is placed in a lower part of the liquid treating element or in a lower part of the liquid supply means.

5. Liquid supply device according to claim 1, characterized in that the raw liquid inlet element is made as an aperture.

6. Liquid supply device according to claim 1, characterized in that the raw liquid inlet element is made as a nozzle.

7. Liquid supply device according to claim 1, characterized in that the raw liquid inlet element is equipped with a temporary retention means.

8. Liquid supply device according to claim 7, characterized in that the temporary retention means is made as a magnet and counterpart to the magnet, placed in a lower part of the raw liquid vessel.

9. Liquid supply device according to claim 7, characterized in that the temporary retention means is made as a mechanical fixation means and counterpart to the magnet, placed in a lower part of the raw liquid vessel.

10. Liquid supply device according to claim 7, characterized in that the temporary retention means comprises a liquid level sensor, connected to the control panel.

11. Liquid supply device according to claim 1, wherein the spout is made as either a separate element fastened to the lid and connected to the liquid supply means or as an element integral with the liquid supply means.

12. Liquid supply device according to claim 11, characterized in that the spout is made as a tube equipped with a rotary joint.

13. Liquid supply device according to claim 11, characterized in that the spout is equipped with an interchangeable head.

14. Liquid supply device according to claim 11, further comprising a flap or a movable cover protecting the spout.

15. Liquid supply device according to claim 14, further comprising an element connected to the control panel and configured to disable the at least one sensor.

16. Liquid supply device according to claim 1, characterized in that the at least one sensor of the control panel is made as a switch placed on the lid or on an outer surface of the raw liquid vessel, and a sensor of the switch's position.

17. Liquid supply device according to claim 1, characterized in that the at least one sensor of the control panel is made as a volumetric sensor.

18. Liquid supply device according to claim 1, characterized in that the at least one sensor of the control panel is made as a mechanical button.

19. Liquid supply device according to claim 1, characterized in that the at least one sensor of the control panel is made as a mechanical valve or an electromechanical valve.

20. Liquid supply device according to claim 1, characterized in that the raw liquid vessel is made as one integral element or as two or more separate elements.

21. Liquid supply device according to claim 1, characterized in that the control panel additionally comprises a wireless communication element with other devices.

22. Liquid supply device according to claim 1, characterized in that the liquid treating element is made as a filtration cartridge.

23. Liquid supply device according to claim 22, characterized in that the filtration cartridge contains filtration mixture on a base of highly effective sorbents.

24. Liquid supply device according to claim 22, characterized in that the filtration cartridge contains a membrane with pore diameter from 0.005 to 5 microns, at least part of an outer surface of the membrane being in contact with a hydrophilic material.

25. Liquid supply device according to claim 24, characterized in that the membrane is made as a hollow fiber membrane.

26. Liquid supply device according to claim 24 wherein the pore diameter ranges from 0.01 to 0.1 microns.

27. Liquid supply device according to claim 22, characterized in that the liquid treating element further comprises a capsule, and wherein the filtration cartridge and the capsule are connected one by one.

28. Liquid supply device according to claim 1, characterized in that the liquid treating element is made as a capsule and contains an additive.

29. Liquid supply device according to claim 28, characterized in that the additive is at least one of a mineralize agent, a pharmaceutical and a flavor additive.

30. Liquid supply device according to claim 28, characterized in that the capsule is additionally equipped with a capillary to supply the additive.

31. Liquid supply device according to claim 28, characterized in that the liquid treating element further comprises a filtration cartridge a connected with the capsule one by one.

32. Liquid supply device according to claim 1, characterized in that the liquid supply means is made as a hollow cylindrical frame.

33. Liquid supply device according to claim 1, characterized in that the pressure generating means is made as a micro compressor or a pump.

34. Liquid supply device according to claim 1, characterized in that the pressure release means is made as a valve or an aperture with a membrane placed inside the valve or the aperture.

35. Liquid supply device according to claim 1, characterized in that the spout is a tube made of an elastically deformable material.

36. Liquid supply device according to claim 1, characterized in that the spout is a tube made with a corrugated part to change a form of the tube.

\* \* \* \* \*